United States Patent
Peters et al.

(10) Patent No.: US 6,258,888 B1
(45) Date of Patent: Jul. 10, 2001

(54) AQUEOUS POLYMER EMULSIONS

(75) Inventors: Antonius Carolus Ida Adrianus Peters, Kaatsheuvel; Gerardus Cornelis Overbeek, Waalwijk, both of (NL)

(73) Assignee: Zeneca Resins BV, Waalwijk (NL)

( * ) Notice: Subject to any disclaimer, the term of this patent is extended or adjusted under 35 U.S.C. 154(b) by 0 days.

(21) Appl. No.: 08/849,908

(22) PCT Filed: Dec. 19, 1995

(86) PCT No.: PCT/EP95/05022

§ 371 Date: Apr. 20, 1998

§ 102(e) Date: Apr. 20, 1998

(87) PCT Pub. No.: WO96/19536

PCT Pub. Date: Jun. 27, 1996

(30) Foreign Application Priority Data

Dec. 21, 1994 (GB) .................................................. 9426048
Aug. 1, 1995 (GB) .................................................. 9515719

(51) Int. Cl.⁷ .............................. C08J 3/00; C08J 39/00; C08J 5/09
(52) U.S. Cl. ......................... 524/522; 524/556; 524/524; 524/321; 524/322
(58) Field of Search .................................... 524/321, 322, 524/522, 556, 524

(56) References Cited

U.S. PATENT DOCUMENTS

| 4,150,005 | * | 4/1979 | Gehman et al. | 524/533 |
|---|---|---|---|---|
| 4,254,004 | | 3/1981 | Abbey | 260/29.6 R |
| 4,277,384 | * | 7/1981 | Arkens | 524/460 |
| 4,456,726 | | 6/1984 | Siol et al. | 524/501 |
| 4,526,945 | * | 7/1985 | Carlson et al. | 526/145 |
| 4,539,361 | | 9/1985 | Siol et al. | 524/458 |
| 4,567,099 | | 1/1986 | Van Gilder et al. | 428/327 |
| 4,627,993 | | 12/1986 | Loomis | 428/36.6 |
| 4,780,503 | | 10/1988 | Mallya | 524/460 |
| 4,894,397 | * | 1/1990 | Morgan et al. | 523/201 |
| 4,954,556 | | 9/1990 | Bull et al. | 524/378 |
| 5,739,196 | * | 4/1998 | Jenkins et al. | 524/460 |

FOREIGN PATENT DOCUMENTS

| 38230/93 | 11/1995 | (AU) | C08F/2/26 |
|---|---|---|---|
| 2066988 | 10/1992 | (CA) | C08F/2/16 |
| 0 555 959 A1 | 8/1993 | (EP) | C08F/265/06 |
| WO 92/02583 | 2/1992 | (WO) | C08L/25/04 |

OTHER PUBLICATIONS

Abstracts in English of EP 509878; EP 8775; EP 37923; DE 4026640 and DD 274229.

* cited by examiner

*Primary Examiner*—Janet Baxter
*Assistant Examiner*—Sin J. Lee
(74) *Attorney, Agent, or Firm*—Pillsbury Winthrop LLP

(57) ABSTRACT

Aqueous emulsion of an organic polymeric material (preferably olefinic), said polymeric material comprising: 1) a hydrophobic polymer part which has a polymodal particle size distribution, and 2) an oligomer part bearing acid groups which imparts or is capable of imparting reversibility to the polymeric material of the emulsion, this being realized, if necessary, by sufficient of the acid groups being in ionised form. Ionisation is usually achieved by raising pH to $\geq 7$ (neutralizing). The polymer emulsion is particularly useful for inks and overprint lacquer formulations, and for paint formulations.

47 Claims, No Drawings

AQUEOUS POLYMER EMULSIONS

This application is the national phase of international application PCT/EP95/05022. filed Dec. 19, 1995 which was designated the U.S.

The present invention relates to an aqueous emulsion of a certain organic polymeric material, and to the polymeric material derived from said emulsion, particularly in the form of a coating.

The use of aqueous emulsions of polymers, commonly known as aqueous polymer latices, is well known in the art for numerous applications, and in particular for the provision of the binder material in coating formulations.

In many coating applications, and in particular in waterborne printing ink and overprint lacquer formulations, it is desirable for the aqueous polymer emulsion to possess, or provide in the resulting coating, a combination of various features and properties:

1) The capability of allowing a very high polymer solids content in the emulsion if desired, since this leads to fast drying to a polymeric film coating and high gloss in the resulting coating.
2) Good film formation (low minimum film forming temperature MFFT, and a low moisture vapour transmission MVRR in the applied coating).
3) The property of reversibility in the polymer of the emulsion. Reversibility (sometimes called redispersability or resolubility) is a property, well known to the printing industry, whereby dry polymer obtained from an aqueous polymer emulsion is redispersible or redissolvable in that same emulsion when the latter is applied thereto. This is of great importance in the process of printing which generally involves applying the waterborne ink-formulation by various cylinders (smooth, engraved or flexo diches); these can become blocked with polymer by evaporation of the water and other volatile organic compounds (VOC's) and/or the ink formulation can dry on the roller surface (e.g. during a short stoppage of the process for one reason or another) and this would obviously create problems when the process is restarted if the polymer were not reversible.
4) The emulsion should have acceptably low viscosity for ease of application when using standard coating techniques.

The problem to be overcome therefore is to simultaneously achieve such properties or features in an aqueous polymer emulsion.

We have now invented aqueous polymer emulsions which can provide the property of reversibility with regard to the polymeric material thereof, may have very high solids contents if desired, have acceptably low viscosity concomitant with both high solids content and reversibility, exhibit improved drying rates and good film formation.

According to the present invention there is provided an aqueous emulsion of an organic polymeric material, said organic polymeric material comprising
1) a hydrophobic polymer part which has a polymodal particle size distribution, and
2) an oligomer part bearing acid groups, which oligomer part imparts, or is capable of imparting, reversibility to the organic polymeric material of the emulsion.

There is further provided according to the invention the use of an aqueous polymer emulsion as defined above in coating applications, and in particular in graphic arts applications such as printing inks and overprint lacquers.

There is yet further provided according to the invention a polymeric material derived from an aqueous polymer emulsion as defined above, particularly in the form of an applied coating, and more particularly in the form of an ink coating or overprint coating.

Thus, conventional polymer emulsions having a monoroodal particle size distribution generally have a solids content of $\leq 45$ wt %. Above 45% solids, the viscosity tends to increase sharply to an unacceptably high value. It is known to achieve high solids content in a polymer emulsion concomitant with acceptably low viscosity by arranging for the polymer to have a polymodal particle size distribution (PSD), i.e. a distribution wherein the particles are of varying size with (or grouped around) two or more distinct maxima in the PSD curve (wt % or intensity—ordinate or y axis; size-abscissa or x axis). For the purposes of this invention a dispersion having a very broad PSD without any discernible maaima (broad gaussian distribution curve) is also considered as having a polymodal PSD. Such polymodal polymer latices can be prepared using known techniques, either by blending preformed monomodal latices of different particle size or by various types of in-situ preparation using integrated synthetic procedures where the polymodal PSD may be derived from essentially different polymers of differing size or essentially the same polymer in which the polyrerisation has been tailored to result in a polymodal PSD. Examples of in-situ preparation of polymodal polymer emulsions are described in EP 81083, EP 567811, U.S. Pat. No. 4,254,004, U.S. Pat. No. 4,539,361, DD 274229 and U.S. Pat. No. 4,780,503. For example in EP 81083, two seed latices are used vwith different particle size which are reacted further vwith monomer. In U.S. Pat. No. 4,254,004 a method is described based on a change in feed rate. In U.S. Pat. No. 4,539,361 and EP 567811 a small sized seed latex is added during a conventional emulsion polymerisation, in DD 274229 a nonionic surfactant is used and in U.S. Pat. No. 4,780,503 an extra shot of anionic surfactant is added during a conventional emulsion polymerisation. However, none of these disclosures address the problem of also achieving reversibility in the polymer of the aqueous emulsion.

On the other hand, it is known to prepare aqueous polymer emulsions comprising an alkali-soluble or alkali-swellable polymer or oligomer and a monomodal hydrophobic polymer, either by blending the preformed latices or by an in-situ preparation to achieve separate and/or composite particles of the two polymer types. In order to achieve reversibility in such polymer emulsions it is necessary to render the emulsion alkaline (if it is not already so) to dissolve the alkali-soluble material. Unfortunately, this dissolution in itself results in general in an unacceptably large increase in emulsion viscosity at solids content >50 weight % for many applications. We have found that this drawback, combined with the essentially monomodal nature of the hydrophobic polymer which also (as mentioned above) tends to incur very high emulsion viscosity at high solids contents, again (in our experience) allows only low solids contents be achieved in most cases—again usually $\leq 50$ weight % more usually $\leq 45$ weight %. Accordingly, one would not expect the use of polymodality to overcome the combined effect of monomodality and oligomer dissolution in yielding high emulsion viscosity at high solids content.

The polymodal nature of the invention polymer emulsion composition thus surprisingly allows one to achieve high solids with acceptably low viscosity in reversible systems, thereby allowing a fast drying rate.

Further still, we have discovered that the use of a polymodal PSD in a reversible polymer emulsion allows one to achieve better film formation (lower MFFT and lower MVRR) in comparison to a corresponding reversible polymer emulsion having a monomodal PSD, and this holds both at low emulsion solids content in so far as film formation is concerned as well as at high emulsion solids content—which is surprising. The very much faster drying rate of an aqueous polymodal reversible emulsion is particularly significant, especially in printing ink applications, where the slow drying rate of conventional water-based systems is a serious drawback in comparison to solvent-based systems, especially on non-porous substrates like those derived from polyolefines. Current waterborne systems often involve overlong drying times which of course reduces production speed in the particular coating application being employed. Furthermore, some heat-sensitive substrates cannot be coated with conventional waterborne systems because they cannot resist the high drying temperatures which are necessary to obtain the required short drying times.

All these drawbacks of waterborne reversible emulsions discussed above are overcome by the polymodal emulsion systems of the present invention—particularly in the realm of waterborne printing ink applications.

By an aqueous polymer emulsion is meant (as is conventional) a dispersion of polymer partides in an aqueous carrier medium in which the dispersed particles are in emulsified form in the carrier medium, usually being of colloidal size, such an emulsion being altematively known as an aqueous polymer latex. The aqueous carrier medium will be mostly or entirely water, and at least 60% by weight of the carrier medium should be water (preferably at least 80%, more preferably at least 95% by weight). Minor amounts of organic liquids may, however, be present; e.g. up to 20 weight % of the carrier medium could be an organic liquid such as isopropanol which could e.g. be added after all the other components of the formulation have been combined.

By a hydrophobic polymer part is meant (as is well known to those skilled in the art) a substantially water-insoluble polymer(s) whose water-insolubility is maintained throughout the pH range. The hydrophobic nature of the polymer(s) is achieved by virtue of the polymer containing a sufficient concentration of at least one hydrophobic monomer (i.e. in polymerised form) to render the polymer hydrophobic and water-insoluble throughout the pH range. Thus the emulsion polymer(s) of component 1) is substantially insoluble in the aqueous medium of the polymeric emulsion regardless of any changes in pH to which the medium might be subjected.

Preferably the hydrophobic polymer(s) has a weight average molecular weight Mw of $\geq 50,000$ g/mol, more preferably $\geq 100,000$. The upper limit is usually not more that 5,000,000. (These Mw's refer to polymer(s) present in the aqueous invention emulsion, and not to a highly crosslinked polymer system which could occur after coating formation when using an invention polymer emulsion which is latently crosslinkable by virtue of having functional groups for subsequent crosslinking purposes—see later; in such a case the molecular weight after coating formation and crosslinking could become infinite).

By an oligomer part is meant, as is conventional, a low molecular weight polymer(s). Preferably the oligomer(s) has a weight average molecular weight (Mw) within the range of from 500–60,000 g/mol, more preferably from 1000–40,000. (Mw for the oligomer(s) will usually be lower than Mw for the polymer(s), preferably by at least 40,000 g/mol).

Mw for the overall or hybrid polymeric material (i.e. inclusive of both the oligomer(s) and the hydrophobic polymer(s)) is often within the range of from 30,000 to 1,000,000 g/mol.

(Mw is determined herein by gel permeation chromatography GPC using appropriate polymer standards).

The oligomer part possesses acid functional groups (usually derived from an acid-bearing monomer(s)) and when sufficient of these are in ionised form the organic polymeric material of the emulsion as a whole is rendered reversible, and there should of course be sufficient of the oligomer(s) present relative to the hydrophobic polymer(s) to allow this property to be achieved—which may depend to some extent on the nature of the oligomer(s), e.g. the tppe and amount of its acid bearing monomer(s) groups, and its molecular weight, and the hydrophilicity/hydrophobicity of any non-acid bearing monomers and their amounts. Generally speaking, however, the weight ratio of the hydrophobic polymer part to the oligomer part is usually within the range of from 50/50 to 98/2, more preferably 75/25 to 95,5.

It may not be necessary for all the acid groups of the oligomer part to be in ionised form in order to achieve reversibility (although they can be if desired), so long as sufficient of them are so ionised to realize this property.

For the sake of clarity, an aqueous polymeric emulsion according to the invention is intended to embrace a system in which the acid groups of the oligomer part are substantially unionised or have yet to be sufficiently ionised to realize reversibility (the oligomer part being then capable of imparting reversibility), as well as an aqueous emulsion in which the acid groups are sufficiently ionised to realize the reversibility capability imparted by the oligomer part (the oligomer part then actually imparting reversibility).

There is still further provided according to the invention a method of preparing an aqueous polymeric emulsion as defined above in which the reversibility imparted by the oligomer part has been or is already realized, said process comprising providing an aqueous emulsion comprising a hydrophobic polymer part and an oligomer part as defined and, if necessary, causing sufficient of the acid groups to be in ionised form so as to realize the reversibility imparted by the oligomer part.

The oligomer part may be present in the aqueous medium in free form, or possibly it may be grafted to the hydrophobic polymer part (i.e. to one or more of the hydrophobic polymers, if more than one is present) or it may be partly in free form and partly in grafted form. Where grafting does occur, it is nevertheless convenient for the purposes of this application to still consider the oligomer and polymer parts as individual entities.

It is believed that the reversibility of the polymeric material as a whole occurs by virtue of the ionised oligomer part being soluble, or sometimes even partially soluble, in the aqueous phase of the emulsion and/or being partly or wholly adsorbed at the hydrophobic polymertwater interface (acting as a stabiliser) or grafted to the hydrophobic polymer partides (acting as a stabiliser). The pH of the emulsion required to effect sufficient acid group ionisation to achieve reversibility will depend irnter alia upon the nature of the add groups present in the oligomer part. For example, if the groups are very strong acid groups such as sulphonic acid groups (pK 1 to 2), the groups will be sufficiently ionised for moot of the pH range, without the requirement for adding an external neutralizing agent always being necessary.

More usually, however, the acid groups of the oligomer part comprise carboxylic add groups, and as initially prepared, the oligomer-mntaining aqueous emulsion will usually be acidic so that it will be necessary to raise the pH of the aqueous medium in order to neutralize sufficient of the add groups (i.e. render them sufficiently ionised) by the addition of a base, such as an organic or inorganic base, examples of which include organic amines such as trialkylamines (e.g. triethylamine, tributylamine), morpholine and alkanolamines, and inorganic bases such as ammonia, NaOH, KOH and LiOH. Of course, the aqueous medium in which the oligomer initially finds itself may already be alkaline (or sufficiently alkaline) such that the add groups (such as carboxyl groups) become neutralized without the requirement for positively adding a base to raise pH.

The required minimum pH of the aqueous medium will depend to some extent on the nature of the carboxylic acid groups and their environment in the polymer, but generally speaking the pH of the aqueous medium will usually be $\geq 6.8$, more usually $\geq 7$, and particularly $\geq 7.3$. Typically the pH of the aqueous medium will be 7.5 to 8.5.

The aqueous polymer emulsion of the invention may, of course, be stored before use with its add groups substantially unionised or insufficiently ionised (i.e. reversibility yet to be realized) (e.g. pH well below 7), and neutralization effected just before use to achieve reversibility. Alternatively it may be stored with acid groups in ionised form (wherein reversibility has been realized), since the reversible invention emulsions are generally very stable.

As mentioned above, the oligomer part may be present wholly in free form or possibly partially or wholly grafted to the hydrophobic polymer(s). If it is in free form, the ionised oligomer part is believed to be dissolved in the continuous aqueous phase of the emulsion and independent of the hydrophobic polymer part, or alternatively it may be wholly or partly absorbed at the hydrophobic polyrner/water interface, acting as a "stabilising material" (i.e. pointing into the water phase instead of lying flat on the particles) and leading to an increased hydrodynamic diameter of the hydrophobic polymer particles. If it is in grafted form, it is believed that the ionised oligomner component will be dissolved in the aqueous phase or possibly swollen in the aqueous phase or just pointing into the aqueous phase (as in the adsorption case) while the hydrophobic polymer part to which it is grafted remains substantially insoluble in the aqueous phase (again leading to an increased hydrodynamic diameter of the hydrophobic polymer partides). Also, a mixture of free and grafted oligormer(s) rmay be present as mentioned above.

The assumption that the ionised oligomer part is probably dissolved in the aqueous phase (whether in ungrafted or grafted form) and/or adsorbed onto the hydrophobic polymer partide surface so as to act as a stabilizer is given firm credence by the fact that when the pH of the aqueous medium is raised to achieve neutralization of acid groups thereof (usually at about pH$\geq 7$) so that these pass from unionised to ionised form, there is a sharp increase in Viscosity of the aqueous emulsion. This increase in viscosity is, nevertheless, muted in comparison to comparable systems employing a monomodal hydrophobic polymer part, and even at very high solids content, e.g. up to 70 weight %, the viscosity can still be acceptable. The polymodal nature of the hydrophobic polymer part thus surprisingly enables one to retain the advantage of high solids with acceptable viscosity (as well as achieving other advantages regardless of solids content, as discussed above), in spite of the oligomer becoming dissolved in the aqueous phase of the emulsion and/or causing an increase in the hydrodynamic diameter of the hydrophobic polymer partices (so increasing interparticle friction) both of which would normally raise the viscosity to an unacceptably high value. Of course, lower solids contents may be employed if desired, and the polymer solids content is usually within the range of from 20 to 70 wt %, more preferably 40 to 70 wt %, and particularly 50 to 65 wt %, on a total weight basis.

The viscosity of the reversible aqueous polymer emulsion of the invention is acceptable even at high solids content as mentioned above in spite of the presence of the dissolved and/or adsorbed ionised oligomer part. Preferably an acceptable value of viscosity is considered to be $\leq 2000$ cps, more preferably $\leq 1000$ cps. (Viscosities are determined herein with a Brookfield Viscometer using LV spindles at 25° C.—ASTM D-2196). A particular advantage with the invention reversible emulsions, as mentioned above, is that acceptable viscosities are achieved even at very high polymer solids content. In a more preferred embodiment, using a carboxylic acid-containing oligomer part, the reversible emulsion has a solids content of from 50 to 70 wt % (more preferably from 50–65 wt %) and a viscosity of $\leq 2000$ cps (more preferably $\leq 1000$ cps). It is particularly preferred that the solids content of the invention reversible aqueous emulsion is at least 52 weight %, more preferably at least 56 weight %, and has a viscosity of $\leq 1000$ cps. The pH of the aqueous medium in such embodiments is usually 8.0–8.5.

The oligomer part and polymodal hydrophobic polymer part may be combined together to form the invention aqueous emulsion in various ways; for example:

a preformed oligomer (usually as an emulsion) may be blended with an in-situ formed polymodal hydrophobic polymer(s) emulsion;

a preformed oligomer (usually as an emulsion) may be blended with an emulsion of a blend of preformed hydrophobic polymers (two or more) of different average particle size (e.g. a blend of large and small particles to achieve a hydrophobic polymer part with bimodal PSD);

an oligomer may be incorporated in-situ into a polymodal hydrophobic polymer(s) emulsion using selected polymerisation procedures (see later), the polymodal hydrophobic polymer part itself having been formed by a blend or by an in-situ procedure (the latter possibly also incorporating the oligomer formation).

By "in-situ" preparation is meant that a polymer(s) or polymer phase(s) has been formed while in the presence of another polymer(s) or polymer phase(s). When the oligomer part is incorporated by an in-situ polymerisation procedure, it is quite possible that this may be at least partially grafted to the hydrophobic polymer part (as discussed above).

Neutralization of the oligomer part, if this is necessary to achieve sufficient add group ionisation so as to realize reversibility, may usually take place at any convenient stage of the preparation and may even be delayed until just before use if this is convenient or desirable (see above).

It may be reiterated that a polymodal polymer emulsion embraces an emulsion having partides of different sizes with two distinct maxima in the PSD curve (usually called "bimodal"), three or more distinct maxima in the PSD curve (usually called "polymodal" for convenience although the term "polymodal" also embraces "bimodal" for the purposes of this specification) and a very broad PSD with no distinct maxima in the PSD curve.

More specifically, examples of in-situ and blend preparations of invention emulsions are briefly as follows (assuming the use of an oligomer part bearing carboxylic acid groups and requiring pH above 7 for neutralization to achieve sufficient ionisation; also mostly employing a bimodal hydrophobic polymer part):

In-situ Preparations (i) Prepare by sequential emulsion polymerisation, firstly a hydrophobic polymer phase with "large" partides, then an oligomer phase; then adjust pH to >7, followed by preparation of a hydrophobic polymer phase with "small" particles;

(ii) Prepare by sequential emulsion polymerisation, firstly a hydrophobic polymer phase with "large" partides, then an oligomer phase, then a hydrophobic polymer phase with "small" particles, adjust pH to >7 after polymerisation;

(iii) Prepare by sequential emulsion polymerisation, firstly a hydrophobic polymer phase with "large" partides, then a hydrophobic polymer phase with "small" partides, then an oligomer phase; adjust pH>7 after polymerisation;

(iv) Prepare by sequential emulsion polymerisation, firstly an oligomer phase (or alternatively the oligomer may be made by aqueous suspension polymerisation or solution polymerisation in organic solvent, removing the solvent in the latter case before dissolving in an alkaline water phase or partitioning into alkaline water before solvent removal in the case of a water-immiscible solvent or dilution with alkaline water in the case of a water-miscible solvent), then adjust pH to >7 and add a previously prepared hydrophobic polymer (as latex) with "large" partides, followed by preparation of a hydrophobic polymer phase with "small partides";

Blend Preparations (v) Blend a bimodal or polymodal PSD hydrophobic polymer emulsion with a neutralized oligomrier emulsion (such that pH>7);

(vi) Blend a bimodal or polymodal PSD hydrophobic polymer emulsion with an unneutralized oligomer emulsion, followed by pH adjustment to >7;

(vii) Prepare a blend of a previously prepared hydrophobic polymer emulsion with "large" particles, a previously prepared hydrophobic polymer emulsion with "small" particles, and a preformed neutralized oligomer latex (such that pH>7);

(viii) Prepare a blend of a previously prepared hydrophobic polymer emulsion with "large" particles, a previously prepared hydrophobic polymer emulsion with "small" particles, and a previously prepared un-neutralized oligomer latex, followed by pH adjustment to >7.

(ix) Prepare a blend of a previously prepared neutralized oligomer/hydrophobic polymer combination in which the hydrophobic polymer particles are "small" and a previously prepared hydrophobic polymer emulsion with "large" particles. (Altematively, the hydrophobic polymer particles of the oligomer/hydrophobic polymer particles may be "large" and the particles of the previously prepared hydrophobic polymer may be "small").

It is to be understood that the terms "large" and "small" above in relation to particle size are intended only in a relative sense (both are "small" in the sense that they provide polymer emulsions).

It will be noted that in the above-described synthetic routes, (i) to (iv) are emulsion polymerisation reactions in several stages (sequential polymerisation) in which the oligomer is in-situ incorporated, whereas routes (v) to (ix) are blends in which the oligomer is incorporated by simple blending. At any emulsion pH including pH of >7 the bimodal or polymodal hydrophobic polymer phases remain substantially undissolved in the aqueous medium. (The stages of a sequential polymerisation herein are usually carried out in the same reaction vessel).

With regard to the hydrophobic polymer part, whatever the type of polymodality of the PSD (bimodal, polymodal, broad PSD) it is preferred that the contribution of particles (irrespective of the number of maxima) of size (i.e. diameter—emulsion particles are generally spherical) between 20 and 180 nm is within the range of from 2 to 70 weight %, more preferably from 15 to 60 weight %, based on the total weight of hydrophobic binder polymer(s). Also preferably, the contribution of particles of size between 180 and 700 nm is within the range of from 30 to 98 weight %, more preferably from 40 to 85 weight % based on the total weight of hydrophobic polymer(s).

In a particularly preferred embodiment, a polyroodal PSD in which two maxima are predominant (i.e. bimodal) of a hydrophobic binder polymeric material is combined with an oligomer phase, using any convenient method, for example using in-situ or blending procedures as described above. (Optionally the oligomer part may be partially or fully grafted to the hydrophobic polymer part). In such an embodiment the weight average partide diameter (i.e. size) Dw of the "small" particles is preferably from 20 to 300 nm, more preferably from 30 to 180 nm. The weight average particle diameter Ew of the "large" particles is preferably from 150 to 700 nm, more preferably from 180 to 500 nm. The difference between the average diameter Dw of the "small" and "large" partides is preferably at least 50 nm, more preferably at least 100 nm. The "large" particles preferably deliver between 40 and 85 weight % of the hydrophobic polymer phase even though the small partides might dominate numerically.

The waterborne hydrophobic polymer part and acid-bearing oligomer part are both preferably derived from the polymerisation of one or more olefinically unsaturated monomers (the oligomer(s) normally being a copolymer, and the hydrophobic polymer(s) being either a homopolymer but more often a copolymer). Such polymers or oligomers are called herein "olefinic polymers" for convenience.

It is, nevertheless, possible for one or both of the waterborne hydrophobic polymer and oligomer parts to be other than an olefinic polymer(s). For example one or both could be a polyurethane, a polyester, a polyamide, a polyurethanelacrylic polymer combination (e.g. a simple blend or a graft of one onto the other). Each type may serve as the oligomer and/or the hydrophobic polymer, and combinations of different polymer types may be used for this purpose. Combinations of olefinic polymers and non-olefinic polymers (such as those mentioned above) can also be used for the hydrophobic polymer and oligomer parts.

Nevertheless it is preferable (as mentioned above) for both the hydrophobic polymer and oligomer parts to be olefinic polym.ers, and their constitution and preparation are herein discussed only in terms of such olefinic polymers.

The monomer system used for the preparation of either an olefinic acid-bearing oligomer or an olefinic hydrophobic polymer is any suitable olefinically unsaturated monomer or combination of monomers which is amenable to (co) polymerisation, provided of course that in the case of forming a hydrophobic polymer, the resulting polymer is substantially water-insoluble irrespective of pH, and in the case of forming an add-bearing oligomner, the monomer system yields a copolymer and includes an acid-bearing comonomer(s) in sufficient concentration (depending on its nature) so that it can impart reversibility to the resulting polymeric material of the emulsion in the aqueous medium of that emulsion (as discussed above). A comonomer(s) bearing an acid-forming group which readily yields or is subsequently convertible to an acid group (such as an anhydride, e.g. maleic anhydride, or an acid chloride) may be used in place of or in addition to an acid-bearing monomer, and for the purposes of this specification is also considered as an acid-bearing monomer.

The hydrophobic polymer may also include polymerised units of an acid-bearing monomer(s), although in such an amount (depending on its nature and on the molecular weight of the polymer) as not to affect the hydrophobic nature of the resulting polymer.

The monomer system for the oligomer could optionally also include a hydrophilic non-ad-bearing monomer(s) bearing a non-ionic dispersing group such as a polyethylene oxide chain or a hydroxyalkyl group which could contribute to the reversibility thereof (usually present at a level of not more than 5 wt %). Examples include polyethyleneglycol acrylate or methacrylate optionally having a capping group such as lower alkyl, e.g. methyl. Similarly for the hydrophobic polymer, although at such a level as not to affect hydrophobic nature therof.

The monomer systems used to make both the acid-bearing oligomer and the hydrophobic polymer will of course include a non-acid-bearing hydrophobic olefinically unsaturated monomer(s) (being a comonomer(s) in the case of an acid-bearing oligomer and also in the case of the hydrophobic polymer unless this is a homopolymer when it would be the sole monomer therefor). (A hydrophobic monomer is one which when polymerised alone, yields a hydrophobic homopolymer).

Typical acid-bearing comonomers include olefinically unsaturated carboxyl-functional monomers such as mono carboxyl-functional acrylic monomers, olefinically unsaturated dicarboxyl bearing monomers and their half esters, and anhydrides thereof; examples include acrylic acid, methacrylic acid, β-carboxyethylacrylate, itaconic acid (and its half ester), maleic acid (and its half ester), itaconic anhydride (and its half ester), maleic anhydride (and its half ester), acrylic anhydride, methacrylic anhydride, and fumaric anhydride (and its half ester). Sulphonic acid-bearing monomers could also be used, such as vinyl sulphonic acid and styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acid. When the acid bearing monomer that is polymerised is already in salt form, the resulting oligomer part will, as made, normally be sufficiently ionised already for realizing reversibility).

Non-acid-bearing hydrophobic monomer(s) which may be copolymerized with the acid monomer(s) in the case of forming oligomers, or homo or copolymerized in the case of forming hydrophobic polymers, include alkylrethacrylates, alkyl acrylates and styrenes; also dienes such as 1,3-butadiene and isoprene, and vinyl esters such as vinyl acetate and vinyl alkanoates. Methacrylates include normal or branched alkyl esters of C1 to C12, especially C1 to C10, alcohols and methacrylic acid (i.e. C1 to C12, especially C1–C10, alkyl methacrylates), such as methyl methacrylate, ethyl ate, n-butyl methacrylate, 2-ethylhexyl methacrylate, n-decyl methacrylate and lauryl methacrylate. Acrylates include normal and branched alkyl esters of C1 to C12, especially C1 to C10, alcohols and acrylic acid (i.e. C1–C12, especially C1–C10, alkyl acrylates), such as methyl acrylate, ethyl acrylate, n-butyl acrylate, n-decyl acrylate and 2-thylhexyl acrylate. Cycloalkyl (6–12 ring carbons) acrylates and methacrylates such as cydohexyl acrylate, cyclohexyl methacrylate, isobomyl acrylate and isobrnylmethacrylate can be used. Styrenes include styrene itself and the various substituted styrenes, such as methyl styrene, α-methyl styrene, t-butyl styrene, o-, m- and p methyl styrene and the corresponding ethyl, chloro and bromo styrenes. Olefinically unsaturated nitriles such as acrylonitrile and methacrylonitrile may also be polymerised, as well as olefinically unsaturated halides such as vinyl chloride, vinylidene chloride and vinyl fluoride.

Non-acid-bearing functional monomers (usually at level of not more than 10 wt %) such as allyl, epoxy (e.g. glycidyl), or hydroxyalkyl (e.g. hydroxyethyl and hydroxypropyl) (meth)acrylates, or divinyl benzene may also optionally be employed as part of or (if not hydrophobic) in conjunction with the non-acid-bearing hydrophobic monomer component. Other examples of such functional monomers include ketofunctional monomers such as vinyl pyrollidone, the acetoacetoxy esters of hydroxyalkyl acrylates and methacrylates such as acetoacetoxyethyl methacrylate, also keto-containing amides such as diacetone acrylamide. Amides such as acrylamide, methacrylamide, methylolated acrylamide, and methylolated methacrylamide, may also be used. One of the purposes of using such functional monomer(s) is to provide subsequent (i.e. latent) crosslinkability in the resulting polymer system should this be desired. Another is to provide improved wet adhesion in the coating if desired (whereby the polymeric film coating retains its adhesive bond to a substrate under damp or wet conditions). Tertiary amine monomers such as dimethylaminoethylacrylate are useful in this respect. It would also be possible to form primary amines in a polymer by iminating carboxyl groups thereof using aziridines such as ethylene imine and propylene imine. (Note also that some of these non-acid-bearing functional monomers, e.g. the hydroxyalkyl (meth)acrylaytes, are also hydrophilic in nature and could therefore also contribute to reversibility in the oligomer if present in suffident amount).

Typically, the acid functional oligomer is derived from a monomer system which comprises 2.5–50 weight % of acid comonomer(s), preferably 3–40 weight % and more preferably 4–14 weight %, and correspondingly 97.5–50 weight % of non-acid-bearing hydrophobic comonomer(s), preferably 97–60 weight %, and more preferably 96–8 weight %. Optionally non-acid-bearing functional comonomer(s) for imparting latent crosslinkability, and/or wet adhesion, and/or additional hydrophilicity (as mentioned above) may also be induded as part of or (if not hydrophobic) in conjunction with the hydrophobic comonomer(s) usually in an amount of 0 to 10 weight %.

A particularly useful nonomer system for the oligomer is that based on 4–25 weight % acid-functional comonomer(s) (particularly methacrylic acid and/or acrylic acid) and 96–75 weight % of non-acid-bearing hydrophobic comonomer(s), as this results in or can provide a reversible polymer emulsion which is especially suitable for providing the binder material in water-based printing ink and overprint lacquer formulations for the graphic arts market.

The non-acid-bearing hydrophobic comnonomer(s) for the oligomer in some cases is usefully selected from at least one of methyl methacrylate, ethyl methacrylate, ethyl acrylate, methyl acrylate, styrene, α-methyl styrene, n-butyl methacrylate, n-butyl acrylate and 2-ethylhexyl acrylate while the acid monomer is for example methacrylic acid and/or acrylic acid. Useful oligomers of this type are derived from a monomer system which comprises 0–40 weight % methacrylic acid, 0–10 weight % acrylic acid, 40–85 weight % methyl methacrylate, 0–30 weight % of one or more of ethyl acrylate, ethyl methacrylate, n-butyl acrylate, n-butyl methacrylate and 2-ethylhexyl acrylate and 0–55, especially 0–40, weight % styrene, provided that the amount of acrylic acid and/or methacrylic acid is $\geq 4$ weight % and preferably does not exceed 40 wt %. Examples of oligomers good for inks or overprint lacquer applications may be derived from a monomer system comprising 0–40 weight % methacrylic acid, 0–10 weight % acrylic acid, 40–90 weight % methyl methacrylate, 0–30 weight % of one or more of 2-ethylhexyl acrylate, ethyl acrylate, ethyl metacrylate,n-butyl acrylate and n-butyl mnethacrylate and 0–35 weight % styrene provided that the amount of acrylic acid and/or methacrylic acid is $\geq 5$ weight % and preferably does not exceed 40 wt %.

Acid functional monomer(s) may also (as mentioned above) be induded as a comonomer(s) (e.g. acrylic or methacrylic acid) when forming the hydrophobic polymer, although at such a level (depending on its nature and on the molecular weight of the polymer) as to not affect the hydrophobic character of the resulting polymer. Generally speaking, the monomer system used to make the hydrophobic polymer will usually contain less than 10 weight % of any acid-functional monomer(s) (no matter of what type) and preferably less than 5 weight %, and in some embodiments none at all. Generally speaking the concentration of acid functional monomer units (wt % basis) in the hydrophobic polymer will usually be less than the concentration of acid functional monomer units in the oligomer.

The hydrophobic polymer(s) may also optionally include non-acid-bearing comonomer(s) for imparting latent crosslinkability and/or wet adhesion, examples of which have been given above when discussing the oligomer(s). The amount will usually be 0 to 10 weight %, and if hydrophilic in nature should not be present in an amount which would vitiate the polymer's hydrophobicity.

The hydrophobic polymer(s) is in some cases usefully made from a monomer system which comprises at least one of styrene, $C_{1-12}$ especially $C_{1-10}$-alkyl methacrylate(s) (such as methyl methacrylate and ethyl methacrylate) and $C_{1-12}$ especially $C_{1-10}$-alkyl acrylate(s) (such as ethyl acrylate, n-butyl acrylate and 2-ethylhexylacrylate). The monomer system may contain only one monomer, i.e. the resulting hydrophobic polymer then essentially being a homopolymer (not taking account of any grafting of oligomer which may have occurred); styrene (alone) for example may be used for the provision of the hydrophobic polymer in this stage. The hydrophobic polymer however is more usually a copolymer. The hydrophobic polymer may also contain acid monomer units, such as methacrylic acid or acrylic acid, but only at a level low enough to not affect the hydrophobic nature thereof. Di- or poly olefinically unsaturated monomers, such as divinyl benzene, or diacrylates or dimethacrylates like 1,3-butylene glycol diacylate, may also optionally be employed as part of the monomer system for the hydrophobic polymer; this will produce a certain amount of crosslinking in the polymer while in the aqueous composition (precrosslinking).

The acid-bearing oligomer(s) and the hydrophobic polymer(s) may both be formed by an aqueous emulsion polymerisation process to form aqueous emulsions (latices) thereof. (Altematively, in certain circumstances, the oligomer may be made by aqueous suspension polymerisation or by solution polymerisation in organic solvent, and the carrier medium either removed to provide a solid oligomeric product which is used in the synthesis by dissolving in alkaline water, or by dissolving into an alkaline water phase before removing the aqueous or solvent carrier medium—by simply basifying in the case of aqueous suspension polymerisation, or by partitioning between solvent and alkaline water in the case of solvent polyersation using water-immiscible solvent or by dilution with alkaline water in the case of using water-miscible solvent). Usually, such an aqueous emulsion polymerisation process is in itself (apart from possible in-situ sequential techniques as described above to achieve polymodal PSD's) quite conventional and well known and so need not be described in great detail. Suffice to say that such a process involves dispersing the monomer(s) in an aqueous medium and conducting polymerisation using an emulsifying agent (surfactant) (although sometimes a conventional emulsifying agent is not required), a free-radical initiator (normally water soluble) and (usually) appropriate heating (e.g. 30 to 120° C.) and agitation (stirring) being employed. The aqueous emulsion polymerisation can be effected with one or more conventional emulsifying agents (surfactants) [e.g. anionic, cationic and/or non-ionic surfactants such as Na, K and $NH_4$ salts of dialkylsulphosuccinates, Na, K and NH4 salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. The alkyl groups in such surfactants (where present) are long chain with e.g. 8 to 22 carbon atoms. Aryl-containing analogues of the alkyl-containing surfactants are also useful particularly those with alkyl substituted aryl groups such as nonylphenol or triisobutylphenol. Other surfactants include phosphoric acid analogues and phosphates. Nonionic surfactants include polyglycol ether compounds composed of from 3 to 100 ethylene oxide groups and/or propylene oxide groups linked to long chain alkyl or aryl (particularly alkyl substituted aryl) groups of the type described above. Other anionic surfactants indude such alkyl or (alk)aryl groups linked to sulphonic acid groups, sulphuric acid half ester groups (linked in turn to polyglycol ether groups), phosphonic acid groups or carboxylic acid groups. Cationic surfactants include such alkyl or (alk)aryl groups linked to tertiary ammonium salt groups. The products of addition of from 3 to 100 moles of ethylene oxide to nonylphenol or triisobutyl phenol, their sulphuric acid half esters, or their phosphoric acid partial esters are typical of these types of emulsifiers. The amount used is preferably 0 to 7% by weight (if used, preferably 0.01 to 7%, more usually 0.3 to 3%) by weight based on the weight of total monomer(s) charged.] The polymerisation can employ conventional free radical initiators [e.g. water-soluble peroxy compounds such as hydrogen peroxide, t-butyl-hydroperoxide, cumene hydroperoxide; water-soluble persulphates such as $NH_4$ persulphate, K persulphate and Na persulphate; water-soluble azo compounds such as azo-bis-cyanovaleric acid or its salts. Redox systems may be used formed of an oxidising component, like alkali metal or ammonium persulphate or hydrogen peroxide and a suitable reducing agent, e.g. isoascorbic acid or Na bisulphite. The amount of the total initiator system (i.e. including a reductor if used) is generally within the range of from 0.01% to 4% based on the weight of total monomer(s) charged].

The emulsion polymerisation process may be carried out using an "all-in-one" batch process (i.e. a process in which all the components to be employed are present in the polymerisation medium at the start of polymerisation) or a semi-batch process in which one or more of the components employed (usually at least one of the monomers, or the monomer if only one is being polymerised) is wholly or partially fed to the polymerisation medium during the polymerisation. Although not preferred, fully continuous processes could also be used.

The polymerisation process employed to prepare the oligomer part must of course be such that a low molecular weight polymer is formed, and for this purpose a suitable chain transfer agent (CTA) for molecular weight control is employed in the polymerisation. Suitable CTA's include mercaptans like n-dodecylmercaptan, n-octylmercaptan, mercapto carboxylic acids having 2 to 8 carbon atoms, and their esters, examples of which are 3-mercapto propionic acid and 2-mercapto propionic acid. Also halogenated hydrocarbons such as bromotrichloromethane can be used.

It is also possible to form the oligomer using a process known as catalytic chain transfer polymerisation. This process is that where a low molecular weight polymer is produced using the technique of radical polymerisation, using a free-radical initiator, in which molecular weight is controlled using a catalytic amount of a transition metal complex, and in particular a cobalt chelate complex assumed to be acting as a CTA, this technique being known in the art as a catalytic chain transfer (CCT) polymerisation. Such a technique has been described fairly extensively in the literature within the last decade or so. For example, various literature references, such as N.S. Enikolopyan et al, J.Polym.Sci., Polym.Chem.Ed., Vol 19, 879 (1981), disclose the use of cobalt II porphyrin complexes as chain transfer agents in free radical polymerisation, while U.S. Pat. No. 4,526,945 discloses the use of dioxime complexes of cobalt II for such a purpose. Various other publications, e.g. U.S. Pat. No. 4,680,354, EP-A-0196783 and EP-A-0199436, describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose, as well as the use of certain chelate complexes of other metals such as iridium and rhenium.

The metal chelate complexes disclosed in these references as well as the specific polymerisation techniques disclosed therein for effecting catalytic chain transfer polymerisation are incorporated herein by reference, and any suitable metal chelate complex may be employed in the production of the acid functional oligomer used in the present invention.

Perhaps typical of such metal chelate complexes are those described in EP-A-199436 which are cobalt II chelates of vicinal iminohydroxyimino compounds, dihydroxyimino compounds, diazadihydroxy-iminodialkyldecadienes and diazadihydroxyiminodialkylundecadienes, optionally including bridging groups such as $BF_2$ and optionally coordinated with further ligands such as water, alcohols, ketones, and nitrogen bases such as pyridine. Particularly preferred in these are optionally hydrated CoII (2,3-dioxyiminobutane-$BF_2)_2$, CoII (1,2-dioxyiminocyclohexane-$BF_2)_2$ and CoII (1,2-diphenyl-1,2-dioxyiminoethane-$BF_2)_2$. The spatial arrangements in such complexes are set out in the specification of EP-A-199436.

Other cobalt 11 chelates that we have found useful are described in WO 95/04759, a particularly useful example of which is Co II 2,12-dimethyl-3,7,11,17-tetraazabicyclo [11.3.1]heptadeca-1(17),2,11,13,15-pentaene cobalt (II) bromide monohydrate which may be obtained as described by D. H. Busch and K. M. Long in Inorganic Chemistry, 9(3), 511, (1970). Further Co II chelates are those described in PCT/GBI02376.

The metal chelate complex allows the effident production of oligomers and is assumed to be acting as a chain transfer agent, although its precise mode of action in molecular weight control is uncertain to us.

The CCT polymerisation process can be carried out in the presence of a polymerisation medium (acting as a carrier medium for the components and as a heat transfer medium) or in the absence of such a medium (i.e. in bulk). When using a polymerisation medium, the polymerisation may be e.g. a solution, suspension or emulsion polymerisation. For the purpose of the present invention the CCT polymerisation if used will usually be effected by aqueous emulsion polymerisation, although solution and suspension polymerisation are also possible.

It will be appreciated (as described above) that one or both of the oligomer and hydrophobic polymer parts of the aqueous emulsion polymer system of the present invention optionally possess functional groups for imparting latent crosslinkability to the composition (i.e. so that crosslinking takes place e.g. after the formation of a coating therefrom). For example, two or more polymers can carry coreactive groups, e.g. amino groups on one of the polymers and epoxy groups on another, or acetoacetoxy or keto or aldehyde carbonyl groups on one of the polymers and amino groups on another, so that a selfcrosslinking (1-pack) system could be envisaged. Alternatively, one or more polymers could carry functional groups such as hydroxyl groups and the composition subsequently formulated with a crosslinking agent such as a polyisocyanate, melamine, or glycouril; or the functional groups on one or more polymers could include keto or aldehyde carbonyl groups and the subsequently formulated crosslinker could be a polyamine or polyhydrazide such as adipic acid dihydrazide; alternatively, one could have zinc-crosslinking, aziridine, epoxy or polycarbodiimide crosslinking of carboxyl groups normally present anyway in the polymer/oligomer combination. Of course, once crosslinked, the polymeric material would probably no longer be reversible so that this property in a crosslinkable polymer system will probably only be present before the polymeric material has undergone any (or any substantial) crosslinking. Therefore to realise the reversible properties of the polymeric material in such cases, treatment with the invention emulsion should normally be undertaken before any curing takes place, which in practice means treatment reasonably quickly after removal of the aqueous phase and certainly before any baking, heating or stoving of the polymeric material if required to effect curing. In fact, such precautions, should preferably also be taken with non-crosslinkable polymeric materials, and in particular it is best in all cases when reversibility is required not to allow the polymeric material to stand for some time and not to be subjected to heating at an elevated temperature while on a substrate.

The test that we have used herein to determine whether or not the polymeric material of an emulsion is sufficiently reversible to fit the needs of this invention is as follows. A 12 micron thick wet film of the emulsion polymeric material (with some drops of a pigment paste added) is cast from the emulsion on to an engraved metal plate and dried for 1 hour at room temperature ($22\pm2°$ C.). Then a droplet (0.05 ml) of the same emulsion is placed on the dried-in coating film and is removed with a wet tissue after a known time interval. Redispersibility or reversibility is obtained when a drop of emulsion polymer dissolves the coloured polymer film within three minutes. Still better degrees of reversibility are achieved when the film is dissolved within 1 minute, and especially within 30 seconds. The reversibility is bad, i.e. the polymer is non-reversible for the purposes of this specification, if the dried film is not redissolved by the drop within three minutes. (It may be added that the pigment used should have no effect whatever on reversibility and is only present to allow the removal from the surface to be followed easily; therefore any suitable pigment can be used).

The polymer emulsion should preferably possess a relatively low minimum film-forming temperature (MFFT), preferably ≦90° C. and more preferably within the range of 0 to 40° C. The minimum film forming temperature of a polymer emulsion of the invention is the temperature where the composition forms a smooth and crackfree coating or film using ASTM D2354 and when applied using a Sheen MFFT bar SS3000. Coalesing solvent(s) may be incorporated in the case of polymeric material that is difficultly film-formable (at e.g. low temperatures) to lower MFFT and improve filmogenicity yet further.

The aqueous emulsions of the invention may if desired be used in various applications (not only just in graphic arts applications), and for such purposes may be combined or formulated with other additives or components, such as defoamers, rheology control agents, thickeners, dispersing and stabilizing agents (usually surfactants), wetting agents, fillers, extenders, fungicides, bactericides, coalescing solvents, wetting solvents, plasticisers, anti-freeze agents, waxes and pigments.

The aqueous emulsions may e.g. be used, appropriately formulated if necessary, for the provision of protective coatings, polishes, varnishes, lacquers, paints, sealants and adhesives (for instance pressure sensitive adhesives). However, their main intended application (in view of their advantageous combination of properties and features, as discussed above) is for providing the basis of waterborne overprint lacquer formulations for the graphic arts market or printing inks, in which case they will necessarily be formulated with pigments (e.g. $TiO_2$, or carbon black). Their use in paint formulations is also a major intended application.

When used for the provision of coatings, the aqueous polymer emulsions of the invention, or formulations based on them, may be applied to various substrates by conventional techniques such as spraying, brushing, flow coating, dipping, and in particular by the various application methods used when applying inks or overprint varnishes to a substrate in printing applications, such as for example flexo and gravure printing, roller coating, air knife coating and off-set printing techniques.

The present invention is now further illustrated, but in no way limited, by reference to the following examples. Unless otherwise specified, all parts, percentages and ratios are on a weight basis. The prefix C before an example number relating to an oligomer/hydrophobic polymer latex composition denotes that it is comparative.

In the examples, the following abbreviations are used.

| | |
|---|---|
| APS | = ammonium persulphate |
| SMBS | = sodium metabisulphite |
| MMA | = methyl methacrylate |
| BA | = n-butyl acrylate |
| MAA | = methacrylic acid |
| Rhodapex* CO-436 | = nonylphenolpolyglycol ether (4EO) |
| (*=trademark of Rhone Poulenc) | = sulphate ammonium salt (surfactant) |
| Akyposal# 9278R | = sodium lauryl polyglycol ether (12EO) |
| (#=trademark of Chemy) | sulphate ester (surfactant) |
| Akyposal# NLS | = sodium lauryl sulphate |
| St | = styrene |
| αMeSt | = α-methyl styrene |
| 2-EHA | = 2-ethylhexyl acrylate |
| EA | = ethyl acrylate |
| EMA | = ethyl methacrylate |
| nDM | = n-dodecyl mercaptan |
| Co CCTA | = Co chelate-based catalytic chain transfer agent |
| i-AA | = iso ascorbic acid |
| t-BHPO | = tert-butyl hydroperoxide |

-continued

| | |
|---|---|
| PSD | = particie size distribution |
| MFFT | = minimum film forming temperature |
| Dw | = weight average particle diameter |
| Mw | = weight average molecular weight |
| CTA | = chain transfer agent |
| $NaHCO_3$ | = sodium bicarbonate |
| RH | = relative humidity |

Aqueous polymer emulsions according to the invention were prepared using examples of both in-situ and simple blending procedures as described above. The method of obtaining a bimodal hydrophobic polymer part used in Example 1 was an in-situ process essentially as described in U.S. Pat. No. 4,539,361, wherein a conventional emulsion polymerisation is begun in the absence of a seed latex to form a hydrophobic polymer phase with "large" partides, and then a small amount of a small size seed latex is added during this emulsion polymerisation and the remainder of the polymerisation carried out in its presence to form a hydrophobic polymer phase with "small" particles. In most of the other examples, a bimodal hydrophobic polymer part was prepared by the in-situ "surfactant shot" method of U.S. Pat. No. 4,780,503 (see above).

In the examples, the following procedures were employed for the measurement of MFFT, drying time, touch dry time, MVTR and partide size.

MFFT Measurements

Measurements were performed on a Sheen Instruments Ltd, MFFT bar SS-3000. The instrument is designed to permit MFFT measurements according to ASTM D-2354, in which wet latex is cast on the bar or plate with a pre-imposed and equilibrated temperature gradient and dry air flow. The MFFT was determined by visual observation of the transition point (temperature) at which the film changes from a turbid white and/or cracked film into a clear and coherent film.

A 60 μm wet layer of the latex was cast on the bar after thermal equilibrium of the bar had been achieved. After 30–60 minutes, when complete drying of the film was established, the transition point (MFFT) was determined. The error range of the visual determination of the MFFT was ±0.5° C.

Drying Times

The drying times were determined by using the simplest gravimetric technique. At time zero, a 100 μm wet layer of latex was cast on an aluminium plate of 100 $cm^2$ which was cleaned with 96% alcohol. The plate was then placed on a weighting balance which was surrounded by a cardboard box to mimic "still" air conditions where the air is neither stagnant nor travelling with dry velocity over the drying surfaces. Ambient conditions remained at 24° C. and 41% relative humidity throughout the experiments. The weight of the plate was read every 20 seconds until it remained constant.

Touch Dry Times

A 80 μm wet layer of latex was cast on a glass plate at 24° C. and 41% RH. The latex film was touched slightly with a finger after several time-intervals. When no fingerprint on the film surface can be discerned, the film is regarded as touch dry. This method is derived from ASTM D1640.

MVTR Measurements

A 400 μm layer of the wet latex, to which 5 weight % butylglycol (coalescent) and 3 weight % Fluowet SB 1% (wetting agent) were added, was cast on a glass plate coated with release paper (with wax top layer). The plates were dried for 6 hours at room temperature followed by 16 hours at 52° C. The dried films, ca 100 μm were then removed from the glass plates and the Moisture Vapour Transmission was measured using a Lyssy model L-80-4000H.

Partide Size

Particle size information herein was determined by Disk Centrifuge Analysis (BTC Brookhaven, 9500 rmp, spinfluid methanol/water), and also by Scanning Electron Microscope and by Photon Correlation Spectroscopy.

EXAMPLE 1

In this example an invention polymer emulsion was prepared by the in-situ sequential procedure of method (iii) as described above, wherein an oligomer part is formed by emulsion polymerisation in the presence of a bimodal hydrophobic polymer part using a mercaptan CTA, followed by raising the pH to >7 to achieve oligomer dissolution and hence reversibility.

Preparation of Small-Size Seed Latex

The following recipe, detailed in Table 1, was employed.

TABLE 1

| No. | Component | Amount (g) |
|---|---|---|
| 1. | Water | 415.81 |
| 2. | Rhodapex CO-436 | 1.31 |
| 3. | APS | 0.69 |
| 4. | MMA | 34.22 |
| 5. | BA | 39.11 |
| 6. | MAA | 2.96 |
| 7. | Rhodapex CO-436 | 0.45 |
| 8. | Water | 74.07 |
| 9. | MMA | 102.66 |
| 10. | BA | 117.33 |
| 11. | Rhodapex CO-436 | 1.34 |
| 12. | Water | 209.69 |
| 13. | APS | 0.35 |

Procedure

Charge 1, 2 and 3 to the reactor and heat the batch to 80° C. Make a stable premulsion of 4, 5, 6, 7 and 8. Start the feed; this should take 60 minutes at 80° C. Keep the batch at 80° C. and maintain the reaction temperature for 30 minutes. Make a stable pre-emulsion of 9, 10, 11, 12 and 13. Start the second feed, this should take 180 minutes, and maintain the reaction temperature at 80° C. for 60 minutes, then cool to room temperature.

Specifications

| | |
|---|---|
| Solids content | 29.6% |
| pH | 2.2 |
| Viscosity | 6 cps (Brookfield spindle LV I/60) |
| Dw | 80 nm |
| MFFT | <0° C. |

Preparation of Invention Emulsion Using Method (iii)

The following recipe detailed in Table 2 was employed.

TABLE 2

| No. | Component | Amount (g) |
|---|---|---|
| 1. | Water | 315.77 |
| 2. | APS | 0.95 |

TABLE 2-continued

| No. | Component | Amount (g) |
|---|---|---|
| 3. | St | 592.67 |
| 4. | 2-EHA | 477.96 |
| 5. | MAA | 53.98 |
| 6. | Rhodapex CO-436 | 16.16 |
| 7. | APS | 3.04 |
| 8. | Water | 408.28 |
| 9. | MMA | 29.60 |
| 10. | EA | 17.42 |
| 11. | EMA | 9.23 |
| 12. | MAA | 2.96 |
| 13. | n-DM | 0.57 |
| 14. | APS | 0.16 |
| 15. | Rhodapex CO-436 | 0.85 |
| 16. | Water | 21.49 |
| 17. | $NH_4OH$ 25% | 1.97 |
| 18. | Seed latex (above) | 1.00 |
| 19. | Water | 10.10 |
| 20. | $FeSO_4$ | 0.01 |
| 21. | i-AA | 2.00 |
| 22. | Water | 20.00 |
| 23. | t-BHPO | 2.40 |
| 24. | Water | 2.40 |
| 25. | Water | 10.20 |

Procedure

Charge 1 and 2 to the reactor; heat up to 80° C. Then charge 3–8 to a feedtank and mix until a stable pre-emulsion is obtained. Start the feed; this should take 230 mn. at 80° C. After 15 minutes of the feed add 17 to the reactor, followed by 18.

Thus up till the addition of 18 (the seed latex), a hydrophobic polymer phase is formed with large particles (composition St/2-EHA/MAA=52.7/42.5/4.8); thereafter a hydrophobic polymer phase of the same composition with small partides is formed due to the presence of the seed latex. When the feed is completed, keep the batch at 80° C for 30 minutes. Charge 9–16 to a feedtank and mix until a stable pre-emulsion is obtained. Start the feed, this should take 10 minutes at 80° C. When the feed is completed rinse with 19 and keep the batch at 80° C. for 60 minutes. Cool to 50° C. and add 20 and ⅓ of 23 and 24. Start a feed of 21 and 22; this should take 45 minutes at 50° C. After 15 and 30 minutes add ⅓ of 23 and 24. Then cool to room temperature. This procedure forms an acid-bearing oligomner part (composition MMA/EA/EMA/MAA=50/29.4/15.6/5;Mw=ca 10,000) in the presence of a bimodal hydrophobic polymer part.

The pH of the emulsion at the end of polymerisation is 3.7. This is raised to pH 8.5 by the addition of ammonia (25%) to ionise the acid groups of the oligomer, thereby causing dissolution in the aqueous medium. The viscosity of the resulting emulsion is measured at pH's of 3.7, 7.5 and 8.5, the increase (see below) demonstrating the oligomer dissolution.

Speifcations

| | |
|---|---|
| Solids content | = 60% |
| pH | = 3.7 Viscosity = 112 cps (Brookfield spindle LV II/60) |
| pH | = 7.5 Viscosity = 180 cps (Brookfield spindle LV II/60) |
| pH | = 8.5 Viscosity = 800 cps (Brookfield spindle LV III/60) |
| MFFT | = 26° C. |

Particle Size Information

TABLE 3

| Bimodal hydrophobic polymer | Dw (nm) | Wt % of all particles | No % of all particles |
|---|---|---|---|
| "small" particles | 84 | 53 | 97 |
| "large" particles | 323 | 47 | 3 |

The reversibility of the system (measured at 20° C.) was found to be good (<3 minutes).

EXAMPLE 2

An invention polymer emulsion corresponding to Example 2 was made using the simple blending procedire of method (ix) as described above, wherein one prepares a blend of a previously prepared neutralized oligomer/hydrophobic polymer combination (here commericially available) in which the hydrophobic polymer particles are "small" and a previously prepared hydrophobic polymer emulsion with "large" particles.

Preparation of "large" Particle Hydrophobic Polymer Emulsion (LP1)

TABLE 4

| No. | Component | Amount (g) (for LP1) |
|---|---|---|
| 1 | Water | 318.41 |
| 2 | APS | 0.5 |
| 3 | Water | 518.41 |
| 4 | Akyposal NLS | 30.06 |
| 5 | APS | 4.91 |
| 6 | St | 525.33 |
| 7 | 2-EHA | 523.57 |
| 8 | MAA | 32.44 |
| 9 | Water | 5.10 |
| 10 | i-AA | 1.41 |
| 11 | Water | 15.00 |
| 12 | t-BHPO | 2.19 |
| 13 | Water | 2.40 |
| 14 | Water | 20.27 |
| | | 2000.00 |

Procedure

Charge 1 plus 2 to the reactor; heat up to 90° C. Charge 3 to 8 to a feedtank and mix until a stable pre-emulsion is obtained. Start the feed; this should take 120 min. at 90° C. Rinse with 9 and keep the batch at 90° C. for 30 min. Cool to 50° C. and add ⅓ of 12 plus 13. Start a feed of 10 plus 11; this should take 45 minutes at 50° C. After 15 and then 30 minutes add ⅓ of 12 plus 13 (i.e. ⅔ in all). Then cool to room temperature and adjust pH with ammonia (25%) to pH=7 and add 14. The resulting polymer latex (composition St/2-EHA/MAA=48.6/48.4/3; Dw=310 nm) is termed LP1.

A 90/10 weight % blend of polymer latex LP1 was made with NeoCryl® BT44 which had been neetralized to pH=8.5 with ammonia (25%) (NeoCryl is a trademark of the Zeneca group of companies). NeoCryl BT44 is a latex of an oligomeri/small particle hydrophobic polymer combination based on styrene and acrylic monomers and having oligomer Mw of ca 10,000, and hydrophobic polymer Dw of 80 nm. This blend, being an emulsion according to the invention, is Example 2. (The 90/10 weight % refers to the total latex weights of these lactices and not to the polymer weights therein).

EXAMPLES 3,4 and 5

Invention polymer emulsions corresponding to Example 3, 4 and 5, were made using the simple blending procedure of method (v), as described above, wherein one prepares a blend of an in-situ formed bimodal hydrophobic polymer emulsion with a neutralized oligomer emulsion (such that pH>7).

Preparation of Insitu Formed Bimodal Hydrophobic Polymer Emulsion (BP1)

TABLE 5

| No. | Component | Amount (g) (for BP1) |
|---|---|---|
| 1. | Water | 396.69 |
| 2. | APS | 0.54 |
| 3. | Water | 155.40 |
| 4. | Akyposal 9278R | 16.22 |
| 5. | APS | 2.65 |
| 6. | St | 269.08 |
| 7. | 2-EHA | 286.62 |
| 8. | MAA | 28.02 |
| 9. | Water | 153.39 |
| 10. | Akyposal 9278R | 16.23 |
| 11. | APS | 2.65 |
| 12. | NaHCO$_3$ | 2.96 |
| 13. | St | 120.28 |
| 14. | 2-EHA | 289.49 |
| 15. | MAA | 28.02 |
| 16. | MMA | 145.93 |
| 17. | Water | 5.10 |
| 18. | Akyposal NLS | 38.92 |
| 19. | i-AA | 1.52 |
| 20. | Water | 15.00 |
| 21. | t-BHPO | 2.36 |
| 22. | Water | 2.40 |
| 23. | Water | 20.80 |
| | | 2000.00 |

Procedure

Charge 1 and 2 to a reactor, heat up till 90° C., Charge 3 to 8 to a feed tank and mix until a stable pre-emulsion is obtained. Start the first feed; this should take 120 minutes at 90° C. When the feed is completed add 18 to the reactor. Charge 9 to 16 to the feedtank and mix until a stable preemulsion is obtained. Start this second feed 45 minutes after the first feed had ended; this should take 120 minutes at 90° C. Rinse with 17 and keep the batch at 90° C. for 30 minutes. Cool to 50° C. and charge ⅓ of 21 plus 22 to the reactor. Start a feed of 19 plus 20; this should take 45 minutes at 50° C. After 15 and 30 minutes add ⅓ of 21 plus 22 to the reactor. Then cool to room temperature and adjust the pH to 7 with ammonia (25%) and add 23. The resulting polymer latex (BP1) is an in-situ formed hydrophobic polymer emulsion with a bimodal particle size distribution, the "large" (first formed) polymer component having a composition St/2-EHA/MAA=46.1/49.1/4.8 and Dw=311 nm, and the "small" (second formed) polymer component have a composition St/2-EHA/MMA/MAA=20.6/49.6/25/4.8 and Dw=45 nm.

Blends of BP1 (at pH=8, using 25% ammonia) with three commercially available oligomer aqueous solutions at blend ratio 80/20 polymer latexlo/ligomer latex were made, corresponding to Examples 3,4 and 5:

Example 3; blend with NeoCryl BT-37
Example 4; blend with Joncryl 678 (20% solution in water at pH=8.5 with ammonia)
Example 5; blend with Johnson SCX-8081

[NeoCryl BT-37 is an aqueous solution of an acrylic oligomer with MAA units, and having Mw of about 40,000 to 50,000.

Joncryl is a trademark of S. C. Johnson. Joncryl 678 is an aqueous solution of an oligomer of analysed composition St/αMeSt/AA=30/45/25, Mw=11,000, and Acid No. 200.

Johnson SCX-8081 is an aqueous solution of a St/acrylic oligomer Joncryl 682 of Mw=1800 and Acid No. 250].

EXAMPLES 6,7 and 8

Invention polymer emulsions corresponding to Examples 6,7 and 8 were prepared using the in-situ sequential procedure of method (iii), where an oligorner part is made by emulsion polymerisation in the presence of a bimodal hydrophobic polymer part using a mercaptan CTA or a Co chelate CCTA followed by raising pH to >7 to achieve oligomer disolution. Unlike as in Example 1, a seeded process was not used to make the bimodal polymer part but instead the surfactant shot method as described in U.S. Pat. No. 4,780,503 was used. The small particles in this case are generated by the addition of an extra shot of anionic surfactant during the preparation of the large particles.

Preparation of Invention Emulsions, Examples 6,7 and 8 Using Method (iii), being Insitu Bimodal Hyrophobic Polymer/Oligomer Emulsions

TABLE 6

| | | Amount (g) | | |
|---|---|---|---|---|
| No. | Component | for Ex 6 | for Ex 7 | for Ex 8 |
| 1 | Water | 396.93 | 298.33 | 386.84 |
| 2 | APS | 0.53 | 0.53 | 0.53 |
| 3 | Water | 153.90 | 202.69 | 155.32 |
| 4 | Akyposal 9278R | 16.07 | 16.07 | 16.22 |
| 5 | APS | 2.63 | 2.63 | 2.65 |
| 6 | St | 250.12 | 286.15 | 268.94 |
| 7 | 2-EHA | — | 264.19 | 286.47 |
| 8 | BA | 300.23 | — | — |
| 9 | MAA | 27.75 | 27.75 | 28.00 |
| 10 | Water | 91.15 | 160.61 | 91.58 |
| 11 | Akyposal 9278R | 9.64 | 12.86 | 9.73 |
| 12 | APS | 1.58 | 2.10 | 1.59 |
| 13 | NaHCO$_3$ | 1.76 | 2.35 | 2.37 |
| 14 | St | 150.07 | 228.92 | 161.37 |
| 15 | 2-EHA | — | 211.35 | 171.88 |
| 16 | BA | 180.14 | — | — |
| 17 | MAA | 16.65 | 22.20 | 16.80 |
| 18 | Water | 64.03 | 44.38 | 61.76 |
| 19 | Akyposal 9278R | 6.43 | 3.21 | 6.49 |
| 20 | APS | 1.05 | 0.53 | 1.06 |
| 21 | NaHCO$_3$ | 1.17 | 0.59 | 0.59 |
| 22 | n-DM | 11.56 | 11.56 | — |
| 23 | Co CCTA | — | — | 0.14 |
| 24 | St | — | 23.12 | — |
| 25 | MMA | 183.60 | 63.36 | 185.30 |
| 26 | EMA | 36.07 | — | 36.41 |
| 27 | EA | — | 11.57 | — |
| 28 | MAA | 11.56 | 11.56 | 11.67 |
| 29 | Water | 5.10 | 5.10 | 5.10 |
| 30 | Akyposal NLS | 38.54 | 38.54 | 38.90 |
| 31 | SMBS | — | — | 0.46 |
| 32 | Water | — | — | 10.00 |
| 33 | i-AA | 1.50 | 1.50 | 1.52 |
| 34 | Water | 15.00 | 15.00 | 15.00 |
| 35 | t-BHPO | 2.34 | 2.34 | 2.36 |
| 36 | Water | 2.40 | 2.40 | 2.40 |
| 37 | Water | 20.15 | 26.51 | 20.55 |
| | | 2000.00 | 2000.00 | 2000.00 |

Procedure

Charge 1 and 2 to a reactor, heat up till 90° C. Charge 3 to 9 to the feedtank and mix until a stable pre-emulsion is obtained. Start the first feed; this should take 120 minutes at 90° C. When the feed is completed add 30 to the reactor. Charge 10 to 17 to the feedtank and mix until a stable pre-emulsion is obtained. Start this second feed 45 minutes after the first feed has ended; this feed should take 70 minutes for Example 6 and Example 8 and 90 minutes for Example 7. When the feed is completed charge 18 to 28 to the feedtank (Example 7 under a stiff nitrogen purge) and mix until a stable premulsion is obtained. Start this third feed 45 minutes after the second has ended. Before the start of the third feed of Example 7 charge 31 plus 32 to the reactor. The third feed should take 50 minutes for Example 6 and Example 8 and 30 minutes for Example 7 at 90° C. Rinse with 29 and keep the batch at 90° C. for 30 minutes. Cool to 50° C. and charge ⅓ of 35 plus 36 to the reactor. Start a feed of 33 plus 34. This should take 45 minutes at 50° C. After 15 and then 30 minutes add ⅓ of 35 plus 36 to the reactor (i.e. ⅔ in total). Then cool to room temperature and adjust the pH to 8 with ammonia (25%) and add 37.
Specifications

EXAMPLE 6

"large" (1st formed) hydrophobic polymer
   composition St/BA/MAA=0.43.3/51.9/4.8
   Dw=278 nm
"small" (2nd formed) hydrophobic polymer:
   composition St/BA/MAA=43.3/51.9/4.8
   Dw=65 nm
oligomer:
   composition MMA/EMA/MAA=79.4/15.6/5
   Mw=about10,000to20,000

EXAMPLE 7

"large" (1st formed) hydrophobic polymer:
   composition St/2-EHA/MAA=49.5/45.7/4.8
   Dw=374 nm
"small" (2nd formed) hydrophobic polymer:
   composition St/2-EHA/MAA=49.5/45.7/4.8
   Dw=56 nm
oligomer:
   composition St/MMA/EA/MAA=20.0/54.8/15.2/10.0
   Mw=about 10,000 to 20,000

EXAMPLE 8

"large" (1st formed) hydrophobic polymer:
   composition St/2-EHA/MAA=46.1/49.1/4.8
   Dw=337 nm
"small" (2nd formed) hydrphobic polymer:
   composition St/2-EHA/MAA=46.1/49.1/4.8
   Dw=49 nm
oligomer:
   composition MMA/EMA/MAA=79.4/15.6/5
   Mw=aboutl10,000to 20,000

Some Specfications and Reversibilities are Summarised in the following Table 7

TABLE 7

| Latex Ex as Code No. | Solids (%) | pH | Visc. (cps) | Reversibility (min) |
|---|---|---|---|---|
| LP1 | 54.6 | 7.0 | 93 | >3.0 |
| Ex 2 | 53.8 | 8.0 | 150 | 0.2 |
| BPI | 60.8 | 7.0 | 363 | >3.0 |
| Ex 3 | 52.0 | 8.7 | 560 | 3.0 |
| Ex 4 | 51.0 | 8.0 | 178 | 3.0 |
| Ex 5 | 55.0 | 8.0 | 990 | 1.0 |
| Ex 6 | 60.3 | 8.0 (8.5) | 308 (770) | 2(1) |
| Ex 7 | 59.4 | 8.0 | 530 | 0.5 |
| Ex 8 | 59.9 | 8.0 | 333 | 0.6 |

TABLE 7-continued

| Latex Ex as Code No. | Solids (%) | pH | Visc. (cps) | Reversibility (min) |
|---|---|---|---|---|
| NeoCryl BT-44 | 45.0 | 8.5 | 305 | 0.2 |

It will be noted that the invention emulsions are possessed of satisfactory reversibility and viscosity, even at high solids content (compare e.g. Example 2 with Neocryl BT44).

EXAMPLES 9, C10, C11

An invention polymer emulsion composition, corresponding to Example 9 was prepared using the in-situ procedure of method (iii) (using the surfactant shot method described above), i.e. an oligoreer part is made by emulsion polymerisation in the presence of a bimodal hydrophobic polymer using a mercaptan CTA followed by raising pH to >7 to achieve oligomer dissolution. For comparison purposes, Examples C10 and C11 were prepared using the same procedure and both having the same overall monomer composition as that of Example 9, but using in place of the bimodal hydrophobic polymer of Example 9 a small size monomodal hydrophobic polymer in Example C10 and a large size monomodal hydrophobic polymer in Example C11. The purpose of these examples was to compare properties such as film formation, MFFT, MVTR and drying rate.

Preparation of the Latex Compositions of Examples 9, C10 and C11

TABLE 8

| No. | Component | Ex.9 | Ex. C10 | Ex. C11 |
|---|---|---|---|---|
| 1 | Water | 376.30 | 631.61 | 371.87 |
| 2 | Akyposal 9278R | — | 36.67 | — |
| 3 | APS | 0.53 | — | 0.47 |
| 4 | NaHCO$_3$ | — | 0.52 | — |
| 5 | Water | 191.05 | 203.28 | 296.07 |
| 6 | Akyposal 9278R | 28.98 | 33.00 | 17.17 |
| 7 | APS | 3.16 | 2.38 | 2.80 |
| 8 | NaHCO$_3$ | — | 0.90 | — |
| 9 | St | 337.97 | 251.31 | 300.01 |
| 10 | 2-EHA | 336.84 | 250.46 | 299.01 |
| 11 | MAA | 20.87 | 15.51 | 15.53 |
| 12 | Water | 109.66 | 118.58 | 172.71 |
| 13 | Akyposal 9278R | 16.91 | 19.25 | 10.01 |
| 14 | APS | 1.84 | 1.39 | 1.64 |
| 15 | NaHCO$_3$ | 2.65 | 0.53 | — |
| 16 | St | 354.83 | 263.84 | 314.98 |
| 17 | 2-EHA | 38.81 | 28.86 | 34.45 |
| 18 | MAA | 12.17 | 9.05 | 10.81 |
| 19 | Water | 16.59 | 17.86 | 25.94 |
| 20 | Akyposal 9278R | 2.42 | 2.75 | 1.43 |
| 21 | APS | 0.26 | 0.20 | 0.23 |
| 22 | NaHCO$_3$ | 0.29 | 0.08 | — |
| 23 | n-DM | 2.90 | 2.16 | 2.57 |
| 24 | MMA | 28.98 | 21.55 | 25.73 |
| 25 | EA | 17.19 | 12.78 | 15.26 |
| 26 | EMA | 8.90 | 6.62 | 7.90 |
| 27 | MAA | 2.90 | 2.16 | 2.56 |
| 28 | Water | 5.10 | 9.85 | 9.85 |
| 29 | Akyposal NLS | 38.65 | — | — |
| 30 | i-AA | 1.97 | 1.47 | 1.75 |
| 31 | Water | 20.00 | 20.00 | 20.00 |
| 32 | t-BHPO | 2.35 | 1.75 | 2.08 |
| 33 | Water | 2.4 | 2.4 | 2.4 |
| 34 | Water | 16.51 | 31.24 | 31.75 |
| | | 2000.00 | 2000.00 | 2000.00 |

Procedure

Charge 1 to 4 to a reactor. Charge 5 to 11 to a feedtank and mix until a stable pre-emulsion is obtained. For Ex. C10 charge 10% of this pre-emulsion to the reactor. Heat up to 90° C. Start the first feed; this should take 145 min. (Ex. 9), 110 min (Ex. C10) or 125 min (Ex. C11) at 90° C. When the feed is completed add 29 to the reactor (note that this component is absent in Exs. C10 and C11). Charge 12 to 18 to the reactor and mix until a stable pre-emulsion is obtained. Start this second feed 45 minutes after the first has ended; this feed should take 85 minutes (Ex. 9), 60 minutes (Ex. C10) or 75 minutes (Ex. C11) at 90° C. When the feed has ended charge 19 to 27 to the feedtank and mix until a stable pre-emulsion is obtained. Start this third feed (to form oligomer) 45 minutes after the second has ended; this feed should take 10 minutes at 90° C. Rinse with 28 and keep the batch at 90° C. for 30 minutes. Cool to 50° C. and charge ⅓ of 32 plus 33 to the reactor. Start a feed of 30 plus 31; this should take 45 minutes at 50° C. After 15 and 30 minutes charge ⅓ of 32 plus 33 to the reactor. Cool to room temperature and adjust the pH to 8.5 with ammonia (25%) and add 34. The resulting oligomer/hydrophobic polymer latex compositions have hydrophobic polymers of bimodal PSD (Ex. 9), small size monomodal PSD (Ex. C10) and large size monomodal PSD (Ex. C11), with all latex compositions having the same overall monomer composition of St/2-EHA/MMA/EA/EMA/MAA=59.8/32.4/2.5/1.5/0.7/3.1. The first phase hydrophobic polymer composition in each is St/2-EHA/MAA=48.6/48.4/3.0%, the second phase hydrophobic polymer composition in each is St2-EHA/MAA=87.4/9.6/3.0 and the third phase oligomer composition in each is MMA/EA/EMA/MAA50.0/29.7/15.3/5.0. For Ex. 9, $D_w$ of the large hydrophobic particles is 348 nm and $D_w$ of the small hydrophobic particles is 30 nm. For Ex. C10, $D_w$=77 nm, and for Ex. C11 $D_w$=396 nm. Various specifications and properties for Examples 9, C10 and C11 are given in the following Table 9.

TABLE 9

| Property/Specification | Ex. 9 | Ex. C10 | Ex. C11 |
|---|---|---|---|
| Solids (%) | 59.8 | 45.1 | 51.7 |
| pH | 8.5 | 8.5 | 8.5 |
| Viscosity (cps) | 230 | 350 | 45 |
| Reversibility (min) | 0.6 | >3 | 1 |
| MFFT (° C.) | 13 | 16 | 18 |
| Drying time (min) (100 μm, 24° C., 41% RH) | 22 | 28 | 26 |
| Touch dry time (min) (80 μm, 24° C., 41% RH) | 4.5 | 7 | 5 |
| MVTR (110 μm, dry film, g/m$^2$/24 h) | 11.7 | 25.6 | 22.9 |

The invention polymer composition of Ex. 9 clearly had the best combination of properties, even at significantly higher solids content, particularly with regard to MFFT, MVTR and drying rate.

EXAMPLES C12, C13, C14

Further comparative oligomer/hydrophobic polymer latex compositions, corresponding to Examples C12, C13 and C14 were prepared using basically the same procedure as for Examples C10 and C11 (except that a Co chelate CCTA is used as a CTA in Ex. C14 rather than n-DM as in Exs. C12 and C13).

The following procedure was employed.

TABLE 10

| No. | Component | Ex. C12 | Ex. C13 | Ex. C14 |
|---|---|---|---|---|
| 1 | Water | 631.77 | 371.87 | 621.72 |
| 2 | Akyposal 9278R | 36.41 | — | 36.74 |
| 3 | NaHCO$_3$ | 0.52 | — | 0.52 |
| 4 | APS | — | 0.47 | — |
| 5 | SMBS | — | — | 0.35 |
| 6 | Water | — | — | 10.00 |
| 7 | Water | 168.19 | 244.92 | 169.72 |
| 8 | Akyposal 9278R | 27.31 | 14.20 | 27.56 |
| 9 | NaHCO$_3$ | 0.75 | — | 0.75 |
| 10 | APS | 1.97 | 2.32 | 1.99 |
| 11 | St | 211.86 | 252.88 | 199.09 |
| 12 | 2-EHA | 195.60 | 233.47 | 212.07 |
| 13 | MAA | 20.54 | 24.52 | 20.73 |
| 14 | Water | 134.55 | 195.94 | 101.83 |
| 15 | Akyposal 9278R | 21.85 | 11.36 | 16.53 |
| 16 | NaHCO$_3$ | 0.60 | — | 0.45 |
| 17 | APS | 1.58 | 1.86 | 1.19 |
| 18 | St | 169.49 | 202.30 | 119.41 |
| 19 | 2-EHA | 156.48 | 186.78 | 127.24 |
| 20 | MAA | 16.44 | 19.62 | 12.44 |
| 21 | Water | 37.31 | 54.02 | 67.93 |
| 22 | Akyposal 9278R | 5.46 | 2.84 | 11.02 |
| 23 | NaHCO$_3$ | 0.15 | — | 0.30 |
| 24 | APS | 0.39 | 0.46 | 0.80 |
| 25 | n-DM | 8.56 | 10.22 | — |
| 26 | Co CCTA | — | — | 0.10 |
| 27 | St | 17.12 | 20.44 | — |
| 28 | MAA | 8.56 | 10.22 | 8.64 |
| 29 | MMA | 46.91 | 55.99 | 137.26 |
| 30 | EA | 13.01 | 15.53 | — |
| 31 | EMA | — | — | 26.86 |
| 32 | Water | 9.85 | 9.85 | 9.85 |
| 33 | i-AA | 1.46 | 1.74 | 1.47 |
| 34 | Water | 20.00 | 20.00 | 20.00 |
| 35 | t-BHPO | 1.73 | 2.07 | 1.75 |
| 36 | Water | 2.40 | 2.40 | 2.40 |
| 37 | Water | 31.22 | 31.73 | 31.22 |
|   |   | 2000.00 | 2000.00 | 2000.00 |

Procedure

Charge 1 to 4 to a reactor. Charge 7 to 13 to a feedtank and mix until a stable pre-emulsion is obtained. For Exs. C12 and C14 charge 10% of this pre-emulsion to the reactor. Heat up to 90° C. Start the first feed; this should take 90 min. (Exs. C12 and C14) or 105 min (Ex. C13) at 90° C. Charge 14 to 20 to the reactor and mix until a stable pre-emulsion is obtained. Start this second feed 45 minutes after the first has ended; this should take 70 minutes (Ex. C12), 85 minutes (Ex. C13) or 55 minutes (Ex. C14) at 90° C. When the feed has ended charge 5 plus 6 to the reactor and charge 21 plus 32 to the feedtank and mix until a stable pre-emulsion is obtained. Start this third feed 45 minutes after the second has ended; this feed should take 20 minutes (Ex. C12/Ex.C13) or 35 minutes (Ex C14) at 90° C. Rinse with 32 and keep the batch at 90° C. for 30 minutes. Cool to 50° C. and charge ⅓ of 35 plus 36 to the reactor. Start a feed of 33 plus 34; this should take 45 minutes at 500C. After 15 and 30 minutes charge ⅓ of 35 plus 36 to the reactor. Then cool to room temperature and adjust the pH to 8.0 with ammonia (25%) and add 37. The resulting oligomer/hydrophobic polymer latices have hydrophobic polymers with small sized monomodal PSD (Exs. C12 and C14) and large size monomodal PSD (Ex. C13). Ex. C12 and Ex. C13 have the same monomer composition as the bimodal invention composition of Ex. 7 and Ex. C14 has the same monomer composition as the bimodal invention composition of Ex. 8. Referring to the hydrophobic polymers of these latex compositions, Ex. C12 has a D$_w$ of 78 nm, Ex. C13 has a D$_w$ of 355 nm and Ex. C14 has a D$_w$ of 80 nm. In the following Table 11, various Specifications and Properties of Ex. C12 and Ex. C14 are compared with those of Ex. 7, and those of Ex. C13 are compared with Ex. 8.

TABLE 11

|   | Ex. 7 | Ex. C12 | Ex. C14 | Ex. 8 | Ex. C13 |
|---|---|---|---|---|---|
| Solids (%) | 59.4 | 44.9 | 52.3 | 59.9 | 45.0 |
| pH | 8.0 | 8.0 | 8.0 | 8.0 | 8.0 |
| Viscosity (cps) | 530 | 200 | 62 | 333 | 165 |
| Reversibility (min) | 0.5 | >3 | 1 | 0.6 | 1 |
| MFFT (° C.) | 12 | 15 | 17 | 10 | 14 |
| MVTR (110 μm dry film, g/m$^2$/24 h) | — | — | — | 20.9 | 26.3 |

The invention composition of Ex. 7 had a superior combination of properties in comparison to those of comparative Exs. C12 and C14 (of the same overall monomer composition), while the invention composition of Ex. 8 had a superior combination of properties in comparison to that of Ex. C13 (of the same overall monomer composition) particularly with regard to MFFR and MVTR

What is claimed is:

1. An aqueous emulsion of an organic polymeric material, said organic polymeric material comprising:
   1) a hydrophobic polymer part which is a substantially water-insoluble polymer(s) whose water-insolubility is maintained throughout the pH range and which has a polymodal particle size distribution, and
   2) an oligomer part which is a low molecular weight polymer(s) bearing acid groups and which oligomer part imparts, or is capable of imparting, reversibility to the organic polymeric material of the emulsion.

2. Aqueous emulsion according to claim 1 wherein the hydrophobic polymer(s) of said hydrophobic polymer part has a weight average molecular weight (Mw) of ≧50,000.

3. Aqueous emulsion according to either claim 1 or claim 2 wherein the oligomer(s) of said oligomer part has Mw within the range of from 500 to 60,000.

4. Aqueous emulsion according to claim 1 wherein the weight ratio of the hydrophobic polymer part to the oligomer part is within the range of from 50/50 to 98/2.

5. Aqueous emulsion according to claim 1 wherein the acid groups of the oligomer part comprise carboxylic acid groups.

6. Aqueous emulsion according to claim 1 wherein sufficient of the acid groups of the oligomer part are in ionised form to impart reversibility to the organic polymeric material of the emulsion.

7. Aqueous emulsion according to claim 6 wherein the acid groups of the olgiomer part comprise carboxylic acid groups and sufficient ionisation has been achieved by raising the pH of the aqueous medium by the addition of a base to effect neutralisation of sufficient of the carboxylic acid groups.

8. Aqueous emulsion according to claim 7 wherein the pH of the aqueous medium is >6.8.

9. Aqueous emulsion according to claim 8 wherein the pH is ≧7.

10. Aqueous emulsion according to claim 1 wherein the polymer solids content thereof is within the range of from 20 to 70 weight % on a total weight basis.

11. Aqueous emulsion according to claim 10 wherein the viscosity of said emulsion is ≦2000 cps.

12. Aqueous emulsion according to claim 11 wherein the oligorner part thereof has carboxylic acid groups and the emulsion has a solids content of 50 to 70 weight %.

13. Aqueous emulsion according to either claim 11 or claim 12 wherein the solids content of the emulsion is >52 weight %, and its viscosity is ≦1000 cps.

14. Aqueous emulsion according to claim 13 wherein the pH of the aqueous medium is within the range of from 8.0 to 8.5.

15. Aqueous emulsion according to claim 12 wherein the monomer system for the oligomer(s) comprises 0 to 40 weight % methacrylic acid, 0 to 10 weight % of acrylic acid, 40 to 85 weight % methyl methacrylate, 0 to 30 weight % of one or more of ethyl acrylate, ethyl methacrylate, n-butyl acrylate and 2-ethylhexyl acrylate and 0 to 55 weight % of styrene provided that the sum of methacrylic acid and acrylic acid is $\geq 5$ weight %.

16. Aqueous emulsion according to claim 12 wherein the monomer system for the oligomer(s) comprises 0 to 40 weight % of methacrylic acid, 0 to 10 weight % acrylic acid, 40 to 90 weight % methyl methacrylate, 0 to 30 weight % of one or more of 2ethylhexyl acrylate, ethyl acrylate, ethyl methacrylate, n-butyl acrylate and n-butyl methacrylate, and 0 to 35 weight %, styrene provided the sum of acrylic acid and methacrylic acid in $\geq 5$ weight %.

17. Aqueous emulsion according to claim 13 wherein the solids content of the emulsion is >56 weight %.

18. Aqueous emulsion according to claim 1 wherein the polymodality of the hydrophobic polymer part has been achieved by an in-situ polymerisation technique and/or by blending preformed monomodal polymer latices.

19. Aqueous emulsion according to claim 1 wherein the oligomer and hydrophobic polymer parts have been combined together by an in-situ procedure.

20. Aqueous emulsion according to claim 1 wherein the oligomer and hydrophobic polymer parts have been combined together by a simple blending procedure.

21. Aqueous emulsion according to claim 1 wherein the hydrophobic polymer part has a bimodal particle size distribution.

22. Aqueous emulsion according to claim 21 wherein the weight average particle diameter of the smaller partides of the bimodal hydrophobic polymer part is within the range of form 20 to 300 nm, the weight average diameter of the larger partides is within the range of from 150 to 700 nm, the difference between the weight average diameters of the smaller and larger partides is $\geq 50$ nm, and the large particles constitute between 40 and 85 weight % of the hydrophobic polymer phase.

23. Aqueous emulsion according to claim 22 wherein the weight average particle diameter of the smaller particles of the bimodal hydrophobic polymer part is within the range 30 to 180 nm, the weight average diameter of the larger particles is within the range of from 180 to 500 nm and the difference between the weight average diameters of the smaller and larger particles is >100 nm.

24. Aqueous emulsion according to claim 1 wherein the hydrophobic polymer part and oligomer part are both derived from the polymerisation of one or more olefinically unsaturated monomers (olefinic polymers).

25. Aqueous emulsion according to claim 1 wherein the monomer system used for the preparation of the oligomer(s) of said acid-bearing oligomer part comprises at least one olefinically unsaturated acid-bearing comonomer, and at least one olefinically unsaturated non-acid-bearing hydrophobic comonomer.

26. Aqueous emulsion according to claim 25 wherein the monomer system used for the preparation of the oligomer(s) comprises 2.5 to 50 weight % of acid-bearing comonomer(s) and 97.5 to 50 weight % of non-acid-bearing hydrophobic comonomer(s).

27. Aqueous emulsion according to claim 26 wherein the monomer system used for the preparation of the oligomer(s) comprises 4 to 25 weight % of acid-bearing comonomer(s) and 96 to 75 weight % of non-acid-bearing hydrophobic comonomer(s).

28. Aqueous emulsion according to claim 27 wherein said acid-bearing comonomer(s) comprises a carboxyl-functional comonomer(s) thereby to provide carboxyl-functional groups in the resulting oligomer.

29. Aqueous emulsion according to claim 28 wherein the acid-bearing comonomer(s) comprises at least one monomer selected from monocarboxyl-functional acrylic monomers, olefinically unsaturated dicarboxyl bearing monomers and half esters thereof, and anhydrides thereof.

30. Aqueous emulsion according to claim 29 wherein the acid-bearing comonomer is selected from the group consisting of methacrylic acid and acrylic acid.

31. Aqueous emulsion according to claim 25 wherein the non-acid-bearing hydrophobic comonomer(s) comprises at least one monomer selected from the group consisting of alkyl methacrylates, alkyl acrylates, styrenes, dienes, vinyl esters, olefinically unsaturated halides and olefinically unsaturated nitriles.

32. Aqueous emulsion according to claim 31 wherein said alkyl methacrylates are C1 to C12 alkyl methacrylates, said alkyl acrylates are C1 to C12 alkyl acrylates and said styrenes are styrene itself, α-methyl styrene or t-butyl styrene.

33. Aqueous emulsion according to claim 25 wherein part of the monomer system used for the preparation of the oligomer(s) comprises a non-acid-bearing functional comonomer(s) for providing latent crosslinkability and/or improved wet adhesion and/or increased hydrophilicity in the resulting polymer system.

34. Aqueous emulsion according to claim 1 wherein the monomer system used for the preparation of the hydrophobic polymer(s) of the hydrophobic polymer part comprises at least one monomer selected from styrenes, alkyl acrylates, alkyl methacrylates, vinyl esters, olefinically unsaturated halides, dienes, and olefinically unsaturated nitriles, and optionally up to 10% by weight of an acid-bearing mnonomer(s) based on the total weight of the monomer system.

35. Aqueous emulsion according to claim 34 wherein said monomer system comprises at least one of stryrene, $C_{1-12}$-alkyl methacrylate(s), and $C_{1-12}$-alkyl acrylate(s).

36. Aqueous emulsion according to either claim 34 or claim 35 wherein part of the monomer system used in the preparation of the hydrophobic polymer comprises a non-acid-bearing functional monomer(s) for providing latent crosslinkability and/or improved wet adhesion in the resulting polymer system.

37. Aqueous emulsion according to claim 1 wherein the oligomer has been formed using a chain transfer agent selected from mercaptans and halogenated hydrocarbons.

38. Aqueous emulsion according to claim 1 wherein the oligomer has been prepared by catalytic chain transfer polymerisation using a transition metal complex.

39. Method of preparing an aqueous polymeric emulsion as defined in claim 1 in which the reversibility imparted by the oligomer part has been or is already realized, said process comprising providing an aqueous emulsion comprising a hydrophobic polymer part and an oligomer part as defined and, if necessary, causing sufficient of the acid groups to be in ionised form so as to realize the reversibility imparted by the oligomer part.

40. Method according to claim 39 wherein the polymodality of the hydrophobic polymer part has been achieved by an in-situ polymerisation technique and/or by blending preformed monomodal polymer latices.

41. Method according to either claim 39 or claim 40 wherein the oligomer and hydrophobic polymer parts have been combined together by an in-situ procedure.

42. Method according to claim 39 wherein the oligomer and hydrophobic polymer parts have been combined together by a simple blending procedure.

43. A polymeric material derived from an aqueous emulsion as defined in claim 1 in the form of an ink coating or overprint lacquer coating, or a paint coating.

44. A coating composition comprising an aqueous emulsion according to claim 1.

45. The composition of claim 44 in the form of a printing ink or overprint lacquer.

46. A method of coating a substrate which comprises coating said substrate with a coating composition according to claim 44.

47. Aqueous emulsion according to claim 1 wherein the hydrophobic polymer(s) of said hydrophobic polymer part has a weight average molecular weight (Mw) of $\geq 100,000$; the oligomer(s) of said oligomer part has Mw within the range of 1,000 to 40,000 and the weight ratio of hydrophobic polymer part to the oligomer part is within the range of 75/25 to 95/5.

* * * * *